INVENTOR
Carey L. Davis
BY: Newton, Hopkins, Jones & Ormsby
ATTORNEYS

INVENTOR
Carey L. Davis ically extending piston to force the hydraulic fluid to the wheel cylinders of the system when the piston is moved from its retracted to its extended position and a reservoir for holding hydraulic fluid located directly above the piston so that the chamber into which the piston fits is replenished through a port connecting the chamber and the reservoirs with fluid each time the piston is returned to its retracted position. The piston and the chamber into which the piston fits have required a considerable amount of sealing in order that any fluid that might leak past the front of the piston when it is in its extended position be returned to the reservoir rather than be lost out of the opened end of the chamber housing the piston. This required frequent maintenance since the seals became worn and allowed leakage of the hydraulic fluid by the piston.

3,360,938
HYDRAULIC BRAKE SYSTEM
Carey L. Davis, Atlanta, Ga., assignor of twelve and one-half percent each to William B. Pritchett, Stone Mountain, and Berthold G. Stumberg, Jr., George M. Eubanks and Richard N. Lester, Atlanta, Ga.
Filed July 27, 1965, Ser. No. 475,194
6 Claims. (Cl. 60—54.6)

This invention relates generally to a hydraulic brake system for wheeled vehicles and more particularly to a brake master cylinder which supplies fluid at different pressures to the different sets of wheels of a vehicle, continues to stop the vehicle even though a portion of the brake system may fail, and utilizes no internal springs in its operation.

When hydraulic brake systems are used to slow or stop a moving wheeled vehicle, it is generally desirable that the brake system stop the vehicle along a straight line of travel and that the brake system still function even if a portion of the system should become inoperative. Moreover, it is desirable that a brake system be as simple as possible in construction so as to increase its reliability and that if one or more of the components of the system fail, all of the fluid associated with the components will not be lost so that the system will fail to stop the vehicle when activated.

Conventional prior art hydraulic brake systems have used master brake cylinder housings which have a horizontally extending piston to force the hydraulic fluid to the wheel cylinders of the system when the piston is moved from its retracted to its extended position and a reservoir for holding hydraulic fluid located directly above the piston so that the chamber into which the piston fits is replenished through a port connecting the chamber and the reservoirs with fluid each time the piston is returned to its retracted position. The piston and the chamber into which the piston fits have required a considerable amount of sealing in order that any fluid that might leak past the front of the piston when it is in its extended position be returned to the reservoir rather than be lost out of the opened end of the chamber housing the piston. This required frequent maintenance since the seals became worn and allowed leakage of the hydraulic fluid by the piston.

Since the bottom of the reservoir communicates with the chamber housing the piston, any foreign matter in the hydraulic fluid settles to the bottom of the reservoir and is washed toward the port connecting the chamber and the reservoir as the fluid replenishes the chamber. This results in the foreign matter either blocking the port or flowing into the chamber so as to cause deterioration of the seals around the piston.

Moreover, most of the prior art brake systems, even though a separate master cylinder may have been provided for each set of wheels, have applied the same pressure to each set of wheels so that all of the wheels are stopped from rotating at approximately the same time. This results in the vehicle being thrown into an uncontrollable skid.

This invention overcomes these and other problems associated with conventional prior art hydraulic brake systems for wheeled vehicles. The apparatus of the invention is a brake master cylinder comprising a housing having a first vertically extending chamber and a second parallel vertically extending chamber which receive first and second displacement members respectively therein. No sealing is needed with the vertically extending displacement members since any fluid that leaks past the front of the piston is held within the chambers by gravity and is returned to the reservoir when the displacement member is retracted.

The first chamber and its associated displacement member supply hydraulic brake fluid to the front set of wheels of a vehicle while the second chamber and its associated displacement member supply hydraulic fluid to the rear set or sets of wheels of the vehicle. A lever system is provided which causes slightly more pressure to be exerted on the hydraulic fluid supplied to the rear set or sets of wheels of the vehicle. This serves to allow the front set of wheels to be slowed in their rotation and the rear set or sets of wheels to be stopped from rotating so that the front set of wheels may still be used for guiding the vehicle even after the rear set or sets of wheels are stopped from rotating. The lever system is so designed, however, that force will still be exerted on the remaining displacement member if that portion of the system associated with one of the displacement members should become inoperative due to a burst wheel cylinder or a depletion of the hydraulic fluid in that portion of the system.

A separate reservoir is employed with each of the chambers and displacement members so that if a portion of the brake system associated with one of the displacement members were to fail and the hydraulic fluid from one of the reservoirs drained out of the system, the remaining fluid in the other reservoir would be sufficient to stop the vehicle. Therefore, substantially all portions of the system must fail before the system will fail to stop the movement of the vehicle.

The reservoirs are positioned along side the chambers rather than over the chambers. This allows a settling well to be constructed at a lower portion of the reservoir so that any foreign matter will settle in the settling well rather than blocking the port connecting the reservoir and its associated chamber or flowing through the port into the chamber and cause that portion of the displacement member exerting force on the hydraulic fluid to deteriorate.

Since no seals are required to prevent leakage from the chamber, the springs associated with the conventional drum brake or disk brake assemblies in the wheels of the vehicle are sufficient to return the displacement members to their retracted positions. This eliminates the need for internal valves and springs normally used in conventional brake master cylinders, thereby greatly reducing the complexity of the invention so that good reliability is maintained.

Also, the lever system is designed so that the effective lever arm connecting the displacement members to the brake pedal is increased as the displacement members are forced further down into the housing of the master cylinder. This, then, allows the operator to be able to exert a greater force on the braking surface in the wheels than he would normally be able to do if the lever system to the displacement members were of the conventional type.

These and other features and advantages of the invention will become more apparent upon consideration of the following specification and the accompanying drawings wherein like characters of reference designate corresponding parts throughout and in which.

The following specification discloses one specific embodiment of the invention, however, the invention is not limited to the embodiments disclosed herein since it may be embodied in other equivalent embodiments.

Figure 1:
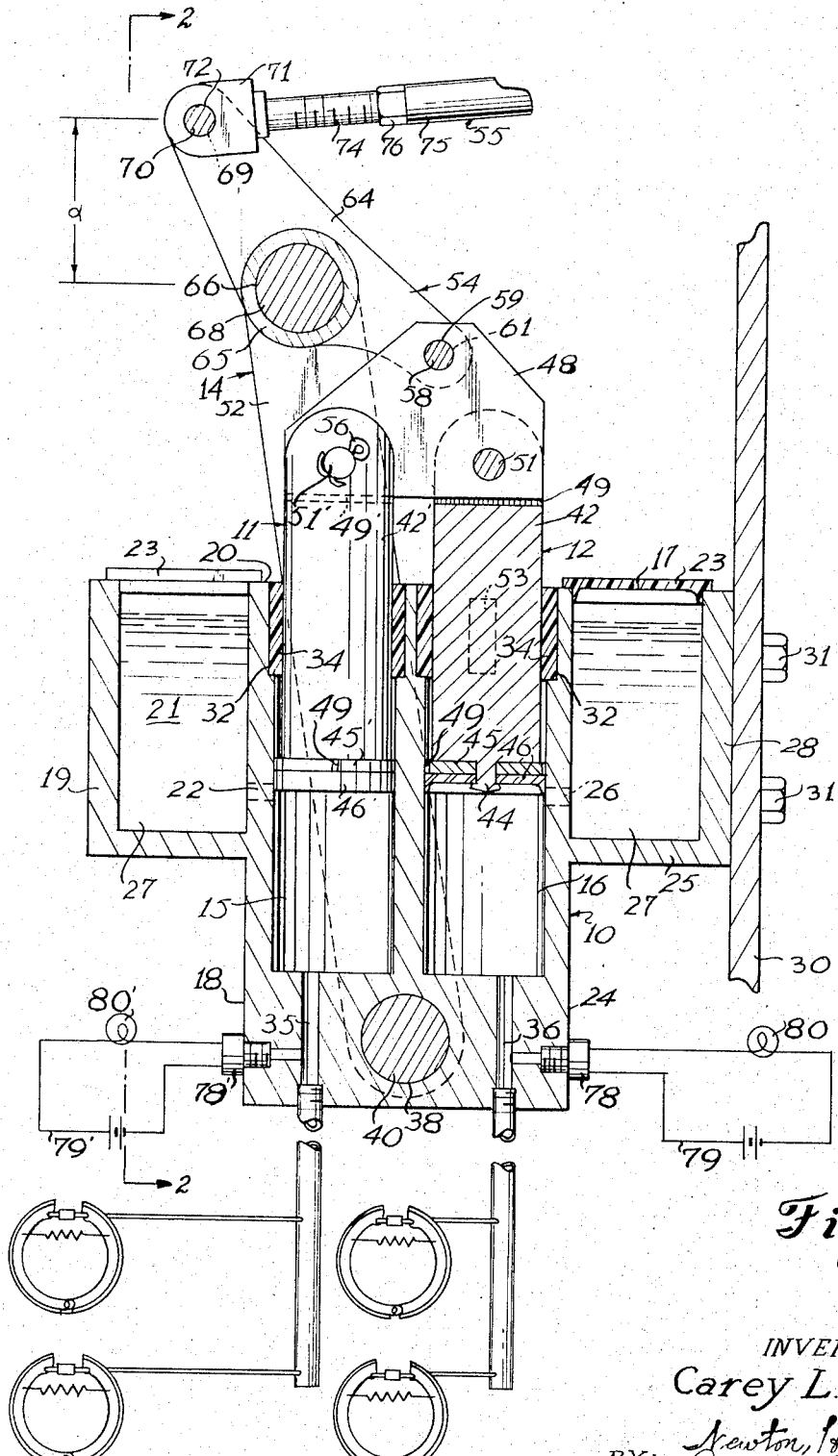
FIG. 1 is a vertical cross-sectional view taken through one embodiment of the invention showing one of the displacement members in section and one of the displacement members unsectioned.

Referring to FIG. 1, it will be seen that the embodiment of the invention comprises generally a housing 10, a first displacement member 11, a second displacement member 12, and a lever system 14 for moving the displacement members 11 and 12 with respect to the housing 10. The entire assembly is bolted to a fire wall or some similar member of the vehicle on which invention is to be used and the lever assembly 14 is connected to the conventional foot pedal manipulated by the operator of the vehicle to stop the vehicle.

The housing 10 is substantially rectilinear solid member having a first cylindrical chamber 15 and a second cylindrical chamber 16 extending a portion of the way therethrough, the centerlines of the first chamber 15 and the second chamber 16 being parallel to each other. The housing 10 is positioned so that the centerlines of the first and second chambers 15 and 16 are disposed in a vertical plane. The chambers 15 and 16 extend downwardly from the top 20 of the housing 10 and terminate upwardly of the bottom of the housing 10.

Integral with the front side 18 of the housing 10 is a first reservoir 19 having a fluid chamber 21 therein extending adjacent the first chamber 15 and communicating with the first chamber 15 through a first pair of refill ports 22 as will be explained later. Integral with the rear side 24 is a second reservoir 25 that extends adjacent the second chamber 16 in the same manner as the first reservoir 19 extends adjacent the first chamber 15 and communicates with the second chamber 16 through a pair of refill ports 26 in the same manner as the refill ports 22 communicate with the first chamber 15. The rear side 28, on the right as seen in FIG. 1, of the reservoir 25 has flanges 29 extending outwardly from either side thereof for mounting the housing on a firewall 30 through a plurality of bolts 31 extending through the flanges 29. The bottoms of the reservoirs 19 and 25 extend slightly below the ports 22 and 26 and are positioned slightly so that a settling well 27 is left at the bottoms of the reservoirs 19 and 25 for allowing foreign matter to settle therein and not obstruct the ports 22 and 26 or damage the displacement members 11 and 12. Each of the reservoirs 19 and 25 is provided with a snap-in cover 23 that may be constructed of a transparent material so that the fluid level in the reservoirs 19 and 25 may be checked easily. The covers 23 have air vents 17 therethrough so that atmospheric pressure is exerted on the surface of the hydraulic fluid in the reservoirs 19 and 25 at all times as is done in conventional brake master cylinders.

The uppermost ends of the chambers 15 and 16 have recesses 32 extending therearound to receive bushings 34 as will be explained later. The lower end of the chambers 15 and 16 communicate with ports 35 and 36 respectively, each of which communicate with the wheel cylinders of a set of wheels of the vehicle as will be explained later. The lower most end of the housing 10 defines a hole 38 therein extending transversely therethrough perpendicular to the centerlines of the chambers 15 and 16. This hole 38 receives a bearing 40 of the lever system 14 as will be explained later.

The first displacement member 11 and the second displacement member 12 are identical, therefore, only the second displacement member 12 will be described in detail and corresponding parts of the first displacement member 11 will be indicated by primes of the numbers used to designate parts of the second displacement member 12. The displacement member 12 comprises a cylindrical piston 42 having a retaining button 44 at one end thereof. The retaining button 44 serves to hold a backing member 45 and a primary cup 46 similar to the conventional primary cup used in conventional master cylinders and serves the same purpose as conventional primary cups. The piston 42 is slightly smaller than the chamber 16 so that, when it is inserted into the chamber 16, a small space is left between the piston 42 and sides of the chamber 16. The backing member 45 has the same diameter as the second chamber 16 so that when the backing member 45 is inserted over the button 44 and the displacement member is inserted into the chamber 16 button end first, the piston 42 is held centered in the chamber 16.

The primary cup 46 is, of course, of conventional design whereby the perimeter of the cup 46 is forced outwardly to seal off the chamber 16 as the displacement member 12 is forced downwardly yet will flex when the piston 42 is moved upwardly so that fluid may seep by the edge of the cup 46. The cup 46 is apertured so that it may be forceably inserted over the button 44 and will be retained by the lip of the button 44. The backing member 45 serves to keep the cup 46 from folding around the edge of the piston 42 and cause the fluid that may be in the chamber 16 to leak past the cup 46 as the piston 42 is forced downwardly. A plurality of slots 49 is provided in the circumferential edge of the packing member 45 so that any fluid that leaks by the primary cup 46 will leak past the backing member 45 and as the piston 42 is raised, fluid trapped above the backing member 45 can return past the cup 46.

The upper end of the piston 42 is bifurcated to form a slot which receives a differential link 48 therein and has a hole (not shown) extending therethrough perpendicular to the centerline of the displacement member 12 and the slot 49 to receive a pin 51 to pin the differential link 48 to the displacement member 12. The slot 49 is constructed so as to extend a short distance below the bottom of the differential link 48 in order that the link 48 may pivot a slight amount but be limited to a slight pivotal movement.

In order that the pistons 42 and 42' be centered at the top of the chambers 15 and 16, a bushing 34 is provided for each chamber 15 and 16 which fits into the recesses 32 and slidably receives the piston 42 therethrough. A screw (not shown) threadably engages the housing 10 at the top 20 thereof so as to retain the bushings 34 in place during operation of the invention. It should be reiterated here that bushings 34 are not seals as were provided with conventional master cylinders for brake systems but are merely guides for the displacement members 11 and 12.

The ports 22 and 26 are located along the chambers 15 and 16 so that they communicate with the chambers 15 and 16 slightly below the primary cups 46 and 46' as seen in FIG. 1 when the displacement members 11 and 12 are in their retracted or uppermost positions. Therefore, refilling of the chambers 15 and 16 is accomplished due to the atmospheric pressure on the surface of the fluid in the reservoirs 10 and 25. Also, as the displacement members 11 and 12 are raised from their lowermost positions, any hydraulic fluid that may have collected between the pistons 42 and 42' is returned to the reservoirs 10 and 25 through the ports 22 and 26.

The linkage system 14 comprises the differential link 48, a pair of pivoting links 52, a floating link 54, and a connector 55. The differential link 48 is a flat plate having a substantially trapezoidal shape whose longer side fits into the slots 49 and 49' of the displacement members 11 and 12. Pins 51 and 51' extend through holes provided in the differential link 48 and the pins 51 and 51' are held in place through the members 11 and 12 by some retaining means such as cotter pins 56.

The upper portion of the differential link 48 has a hole 59 therethrough to slightly receive a pin 58. The location of the hole 59 is such that it is displaced slightly to the right as seen in FIG. 1 from the perpendicular bisector of a line joining the center of the pins 51 and 51'. This places the pin 58 slightly nearer the pin 51 so that when the pin 58 is forced downwardly, more force is exerted on the pin 51 than on the pin 51'. This results in a greater amount of force being applied to the second displacement member 12 and its related fluid than is applied to the first displacement member 11 and its related fluid.

The pivoting links 52 are positioned on either side of the housing 10 and are pivotally attached to the housing 10 by the bearing 40 extending through the hole 38. Nuts 60 threadedly engage the extending ends of the bearing 40 and retain the pivoting links 52 on either end thereof. A bushing 43 is provided between each of the links 52 and the housing 10 around the bearing 40 so that the pivoting links 52 may pivot easily about the bearing 40. A stop 53 is provided on either side of the housing 10 to prevent the links 52 from pivoting past a vertical position and move toward the fire wall 30. This serves to prevent the lever system from becoming inoperative.

The floating link 54 comprises a first link plate 62 and a second link plate 64 which have substantially the same triangular shape and are positioned on either side of the displacement link 58. Connecting the link plates 62 and 64 together is a sleeve bearing 65 which extends between the link plates 62 and 64 and outwardly from either side thereof. The sleeve bearing 65 is centered around an aperture 66 shaped to receive a bearing rod 68. The lower ends of the link plates 62 and 64 have apertures 61 therethrough aligned along a common centerline to receive the pin 58. The upper ends of the link plates 62 and 64 have apertures 69 therethrough aligned along a common centerline to receive a connector pin 70.

The connector 55 is pinned to the floating link 54 by the connector pin 70 and has an attaching lug 71 at one end thereof which is positioned between between the upper ends of the link plates 62 and 64 and has an aperture 72 therethrough for receiving the connector pin 70. The connector link 55 has a conventional link adjustment of a *male* threaded member 74 received in a female threaded member 75 to increase or decrease the length of the connector 55 and a lock nut 76 to lock the female member 75 with respect to the male member 74 to prevent inadvertent shifting of the length of the connector 55. The end of the connector 55 (not shown) is connected to the extending end of a brake pedal (not shown so that when the brake pedal is depressed by the operator of the vehicle, the connector 55 is moved to the right as shown in FIG. 1.

A conventional brake pressure switch 78 communicates with the port 35 associated with the camber 15 and is a component in a conventional electric circuit 79 which includes a brake lamp or tail light 80 of the vehicle. Therefore, when the brake foot pedal (not shown) is depressed by the operator of the vehicle and the fluid in the port 35 is pressurized, the switch 78 completes the circuit 79 so that the lamp 80 is lighted and remains so until the brake foot pedal is released so that the fluid within the port 35 is depressurized.

Another conveintional brake pressure switch 78' communicates with the port 36 associated with the chamber 16 and is a component in a conventional electrical circuit 79' which includes the other brake lamp or tail light 80' of the vehicle. Therefore, when the brake foot pedal (not shown) is depressed by the operator of the vehicle, the fluid in the port 36 is pressurized so that the switch 78' completes the circuit 79" and causes the lamp 80' to light and remain so lit until the operator releases the brake foot pedal.

This serves to provide an indication of whether both sections or portions of the system are functioning properly since both lamps 80 and 80' light when the pedal (not shown) is depressed only so long as both pressure switches 78 and 78' are closed. Therefore, if the fluid in one part of the system becomes depleted for some reason, one of the lamps 80 or 80' will not light when the pedal (not shown) is depressed and will be a signal to the passing motorist or law enforcement officer that a portion of the brake system is not functioning properly so that they may in turn warn the operator. Also a system of lamps may be installed in the dashboard of the vehicle to indicate when the pressure switches 78 and 78' are closed.

Operation

From the foregoing it should be apparent that in operation, the housing 10 is attached to a firewall, such as firewall 30, so that the centerlines of chambers 15 and 16 lie in a vertical plane. The reservoirs 19 and 25 are filled and the ports 35 and 36 are connected respectively to the front set of wheels of the vehicle and the rear set, or sets, of wheels of the vehicle. The pressure switch 78 and its associated circuit 79 and lamp 80 are arranged so that the lamp 80 is one of the tail lights of the vehicle. The pressure switch 78' and its associated circuit 79' and lamp 80' are arranged so that the lamp 80' is the other tail light of the vehicle. The connector 55 is attached to the appropriate place on the conventional brake pedal (not shown) of the vehicle so that when the brake pedal (not shown) is depressed, the connector 55 moves to the right as seen in FIG. 1. This causes the pin 58 to force the differential link 48 downwardly thereby forcing the displacement members 11 and 12 downwardly into the chambers 15 and 16. The connector 55 is adjusted to the proper length by rotating the female member 75 with respect to the male member 74 until the displacement members 11 and 12 are in their uppermost retracted position, to allow the refill ports 22 and 26 to be uncovered. This allows the hydraulic fluid contained in the reservoirs 19 and 25 to flow through the ports 22 and 26 to fill the chambers 15 and 16 below the displacement members 11 and 12.

When the operator of the vehicle presses the brake pedal (not shown), the displacement members 11 and 12 are forced downwardly into the chambers 15 and 16 and exert a force on the hydraulic fluid in the chambers 15 and 16. This serves to expand the peripheral edge of the primary cups 46 and 46' so that the chambers 15 and 16 are sealed during the downward movement of the displacement members 11 and 12. This, in turn, exerts a pressure in the wheel cylinders in the front and rear sets of wheels of the vehicle and to apply the braking surface of the wheels and thereby cause the wheels to stop turning. It will be reiterated here that the force on the displacement member 11 due to the displacement of the pin 58 toward the center line of the displacement member 12 and serves to stop the rear set or sets of wheels of the vehicle from turning before the front set of wheels of the vehicle are stopped from turning. This allows the front set of wheels to direct the direction of travel of the vehicle during braking.

As pressure is exerted on the hydraulic fluid in the ports 35 and 36, the pressure switches 78 and 78' are activated hereby causing the lamps 80 and 80' to light and warn motorists behind the vehicle that the brakes are being applied.

When the connector 55 moves the upper end of the floating link 54 to the right as seen in FIG. 1, the maximum extension of the displacement members 11 and 12 into the chambers 15 and 16 is reached when the pivoting links 52 are in a vertical position and the stops 53 serve to prevent the pivoting links 52 from proceeding past this maximum point of extension of the displacement members 11 and 12.

Figure 2:
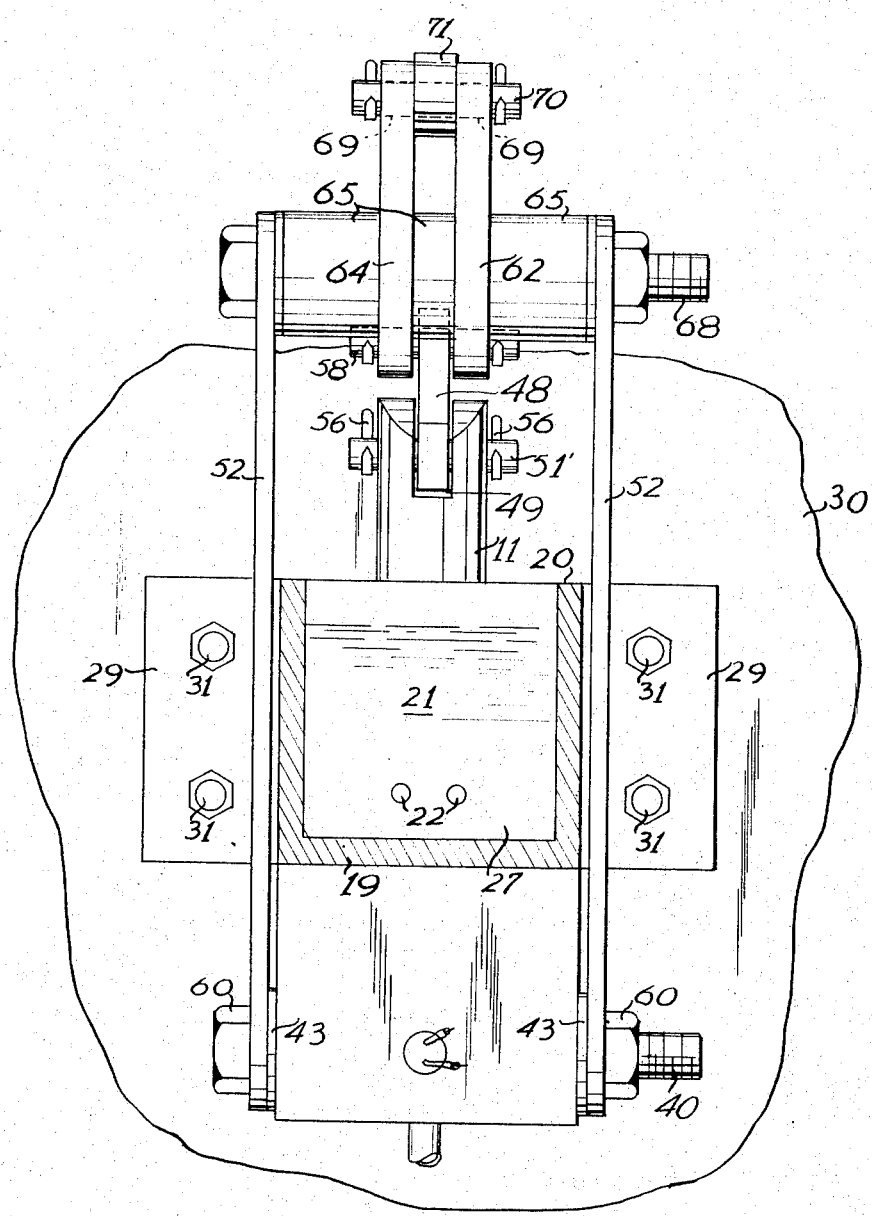
FIG. 2 is a cross-sectional view of the embodiment of the invention shown in FIG. 1 taken along the line 2—2 of FIG. 1.
Figure 3:
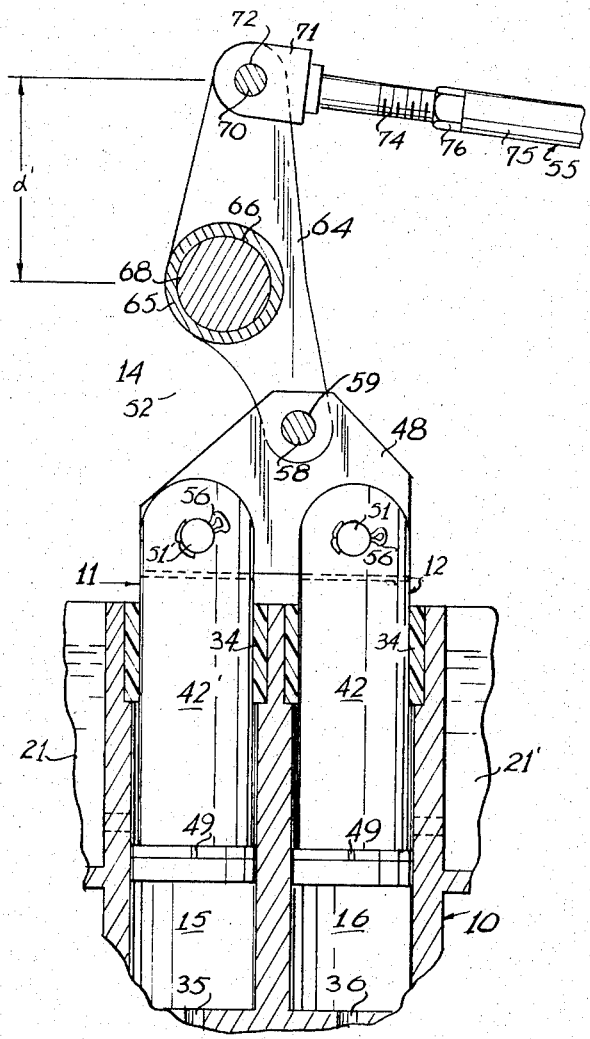
FIG. 3 is a partial sectional view taken as in FIG. 1 showing the increase in the effective lever arm of the lever system as the displacement members are extended.

As the brake pedal (not shown) is released, the force exerted on the hydraulic fluid in the wheel cylinders by the springs in the wheels, forces the displacement members 11 and 12 upwardly as seen in FIG. 1 and FIG. 2 and moves the connector 55 to the left as seen in FIG. 1 and FIG. 3. Hydraulic fluid surrounding the pistons 42 and 42' forced back into the reservoirs 19 and 25 as the pistons 42 and 42' are moved upwardly as seen in FIG. 1. Any pressure that may build up between the backing members 45 and 45' and bushings 34 is released through the slots 49 and 49' in the backing members 45 and 45' and allowed to escape past the primary cups 46 and 46' into the chambers 15 and 16 below the primary cups 46 and 46'.

If a portion of the system fails, say that portion of the system associated with port 36, the hydraulic fluid in the reservoir 25 would become depleted after a number of times of applying the brakes, but that portion of the system associated with port 35, not having failed, will still operate to stop the vehicle until repair can be made on the inoperative portion of the system. The displacement member 11 will still operate even though the displacement member 12 may be inoperative since the slot 49' in the top of the piston 42' will only allow the differential link 48 to pivot a certain amount before applying downward force to the displacement member 11 as the brake pedal (not shown) is depressed.

As seen in FIGS. 1 and 3, the effective lever arm indicated at α in FIG. 1 and α' in FIG. 3 are different, being greater in FIG. 3 than in FIG. 1. This results in the operator's being able to exert a greater relative force on the pin 58 to force the displacement members 11 and 12 downwardly when the operator moves the brake pedal (not shown) nearer the end of stroke of the brake pedal.

When one portion of the system becomes inoperative such as that described for that portion of the system associated with the port 36, the lamp 80 will fail to light when the brake pedal (not shown) is depressed by the operator of the vehicle and will serve to warn motorists that the operator has a malfunctioning brake system. Moreover, installation of a lamp on the dashboard of the vehicle in series with a lamp 80 will allow the operator to also tell when he has a malfunctioning portion of the brake system. Likewise, malfunction of that portion of the system associated with the port 35 may also be detected by motorists behind the vehicle when the brakes are malfunctioning and a lamp on the dashboard of the vehicle in series with the lamp 80' would indicate to the operator when this portion of the brake system was malfunctioning.

It will be obvious to those skilled in the art that various changes may be made in the invention without departing from the spirit and scope thereof and therefore, the invention is not limited by that which is described in the specification, but only as indicated in the appended claims.

What is claimed as invention is:

1. A brake system of the type utilized with a wheeled vehicle comprising a master brake cylinder assembly defining a pair of cylinders in parallel juxtaposition, a piston reciprocally received in each cylinder, each of said pistons including an exposed extending outwardly of its cylinder, said exposed ends each including bifurcated extensions defining a slot, a differential link pivotally connected between the exposed ends of the pistons within the slots thereof, a floating link connected at its first end to said differential link between its connections to said pistons, a pivotal link connected at the first of its ends to said floating link at a point intermediate the ends thereof and connected at the second of its ends to a pivot point disposed on the side of said cylinders away from said differential link, and a connector member connected to the second end of said floating link whereby movement of the connector causes said pivotal link to pivot about its pivot point to move the floating link in an arc about said pistons, to pivot said floating link about the first end of said pivotal link, and to pivot said differential link with respect to the first end of said floating link to reciprocate said pistons in their cylinders.

2. The invention of claim 1 wherein said floating link is connected to said differential link at a point on said differential link that is closer to one of said pistons than the other of said pistons.

3. The invention of claim 1 wherein the configuration of the slots of said pistons and said differential link are such that the pivotal movement of said differential link in said slots is limited.

4. A brake system for use with a wheeled vehicle comprising a master cylinder assembly defining a pair of cylinders in parallel juxtaposition, a piston slidably received in each cylinder, a first link member connected between said pistons, a second link member connected at one of its ends to said first link member at a point between the connections thereof to said pistons and connected at the other of its ends to an actuating member, a third link member including a free end movable in an arc about said pistons and connected to said second link member intermediate the ends thereof, whereby movement of said actuating member in a first direction causes the free end of said third link to move in an arc about said pistons, said second link to pivot about the free end of said third link, and said first link to move the pistons in their cylinders.

5. The invention of claim 4 wherein said first link member is pivotally connected to each of said pistons, said first link member and said pistons comprising means for limiting the pivotal movement of said link member with respect to said pistons.

6. A brake system for a wheeled vehicle including a master cylinder apparatus defining a pair of cylinders in parallel juxtaposition, a piston slidably received in each of said cylinders for compression of any fluid present in said cylinders to pressurize the brakes of the brake system, and actuating means for causing said pistons to move into their cylinders including means for moving either of said pistons further into its cylinder than the other piston and for limiting the amount either of said pistons is movable with respect to the other piston each of said pistons defining slots therein, said actuating means comprising a linkage member pivotally connected to said pistons within said slots in such a manner that the slots limit the pivotal movement of said linkage member.

References Cited

UNITED STATES PATENTS

| | | | |
|---|---|---|---|
| 1,786,912 | 12/1930 | Madden | 60—54.6 |
| 2,038,898 | 4/1936 | Goodyear et al. | 60—54.5 X |
| 2,131,459 | 9/1938 | Weatherhead | 60—54.6 X |
| 2,191,987 | 2/1940 | Goepfrich | 60—54.6 X |
| 2,541,312 | 2/1951 | Vogel | 60—54.6 |
| 2,559,850 | 7/1951 | Davis | 60—54.6 X |
| 2,694,191 | 11/1954 | Falanga et al. | 60—54.6 X |
| 2,741,896 | 4/1956 | Geiger | 60—54.6 |
| 2,815,502 | 12/1957 | Zeller | 60—54.6 X |
| 2,857,584 | 10/1958 | Gibson | 60—54.6 X |
| 2,884,803 | 5/1959 | Willis | 60—54.6 X |
| 2,953,936 | 9/1960 | Wiley | 60—54.6 X |
| 3,049,885 | 8/1962 | Tuten | 60—54.6 |
| 3,220,189 | 11/1965 | Caramanna | 60—54.6 |
| 3,248,883 | 5/1966 | Bowlsby | 60—54.6 |
| 3,258,298 | 6/1966 | Holland | 60—54.5 X |

FOREIGN PATENTS

| | | |
|---|---|---|
| 869,772 | 11/1941 | France. |
| 78,687 | 5/1952 | Norway. |
| 169,902 | 12/1959 | Sweden. |

MARTIN P. SCHWADRON, *Primary Examiner.*

ROBERT R. BUNEVICH, *Examiner.*